Patented Oct. 29, 1946

2,410,103

UNITED STATES PATENT OFFICE 2,410,103

METHOD OF CURING ACRYLATE POLYMERS AND RESULTING PRODUCT

Leo W. Rainard, Cochituate, Mass., assignor, by mesne assignments, to National Dairy Products Corporation, New York, N. Y., a corporation of Delaware No Drawing. Application November 28, 1942, Serial No. 467,205

1 Claim. (Cl. 260—79)

This invention relates to compositions having elastic properties similar in many respects to those of natural rubber.

More particularly the invention relates to polymers of acrylate type compounds or polymers in which an acrylate compound is one of the polymerizing monomers, and which polymers are formed so that at one stage of their manufacture they have plastic flow properties rendering them suitable for molding, following which the plastic flow characteristics may be eliminated and the elastic characteristics enhanced, such as is accomplished in the vulcanization of rubber.

Since the invention is concerned with compositions similar in many respects to rubber, the compositions may be considered in relation to the properties of rubber. In its natural state rubber is elastic, but it also possesses plastic flow properties. The latter can be enhanced by milling the rubber. This plastic flow characteristic of rubber renders it possible to mold the rubber into any desired form.

While the plastic flow properties are desirable to permit molding of the rubber, they are undesirable in the final molded product which should have elastic properties and which should retain its shape. In order to eliminate this plastic flow, it has been the practice to mill sulfur into the rubber during the milling operation. At the time the rubber is molded or subsequently the rubber-sulfur mixture is heated. This action eliminates the plastic flow. This is termed "vulcanization." This result is explained on the bases that the sulfur reacts with unsaturated or double bonds in the natural rubber. As a result the vulcanized rubber may be deformed upon the application of a stress, but resumes its original shape upon release of the stress.

In processing polymers, such as polyacrylates or acrylate-containing polymers, it is desirable to be able to follow the standard techniques followed in the rubber industry. This requires a product which at some stage in its manufacture possesses plastic flow properties so as to permit molding and to enhance these properties if necessary by milling. Following or during the molding operation it is desirable to eliminate the plastic flow properties so that the final product is free from plastic flow or possesses a minimum of this property. In fact, it is absolutely essential that the final product be free from plastic flow if it is to be useful as an alternate for rubber.

Because the techniques of the rubber industry have been well developed, it is specifically desirable in producing an elastic composition, or a so-called "synthetic rubber" (even though this may not be the same chemically as natural rubber or respond to the same treatments) that such a composition be capable of passing through the two-stage rubber process referred to above. This renders the composition utilizable by the workmen skilled in the rubber technique and by equipment that is available for this purpose.

It might be possible to form acrylate polymers which have the plastic flow characteristics eliminated during the polymerization, but these could not be molded. It is essential, therefore, that the polymer be formed with plastic flow properties and these eliminated after molding by a process which retains or enhances elasticity.

It is an object of my invention to produce a composition consisting primarily of the polymerization product of acrylates and which is therefore different chemically from rubber, but is nevertheless adapted to be processed in accordance with the established rubber technique of molding and curing and which has upon completion of the curing, an enhanced elasticity, a freedom from plastic flow, and a number of other properties similar to those of vulcanized rubber.

Compounds which contain a single ethylene linkage, such aso acrylic acid, alkyl esters of acrylic acid, acrylo-nitriles, amides, etc., have long been known to be polymerizable into long chain polymers. These polymerized compositions have some elastic properties, but they also possess plastic flow properties. As far as I am aware it has not been regarded as a possibility heretofore to vulcanize or cure an acrylate polymer so as to eliminate plastic flow, although attempts have been made to treat them with the strongest vulcanizing agents heretofore known for vulcanizing rubber. The failure of the acrylate type polymers to respond to sulfur vulcanization may be attributed to the fact that the acrylate type polymers are saturated and there are no double bonds with which the sulfur may react.

I am aware of the fact that it has been proposed heretofore to co-polymerize acrylic compounds, such as acrylo-nitrile, with diene compounds, such as butadiene, and that such compounds are capable of vulcanization. This is attributed to the fact, however, that the double bond which remains in the polymerizing unit of the diene compound is available for reaction with sulfur. However the straight acrylate polymers may be produced readily on a large scale, and their usefulness would be greatly enhanced by a technique for vulcanizing them or eliminating the plastic flow so as to have properties simulating natural rubber.

In accordance with my invention I have been able to cure or vulcanize polyacrylates, in which the polymer is saturated, to produce a composition free from plastic flow and having many properties similar to natural rubber.

As illustrative of one method by which this can be accomplished polymethyl acrylate was dissolved in benzene to form approximately a 10% solution. Bromine in an amount of 4%, based on the weight of the polymethyl acrylate, was passed into the solution which was stirred and placed under a photoflood lamp. There was an evolution of a gas, which may have been hydrobromic acid, and the reaction was permitted to proceed until the product was substantially colorless. The material was then dried by evaporating the benzene. The resulting product was plastic and was milled with about 4% of sodium sulfide. Following this the product was heated in the desired shape to 160° C. for two hours. The resulting material was exceedingly tough and did not undergo plastic deformation, did not melt, and did not dissolve in benzene after three days immersion.

The product is the equivalent of vulcanized natural rubber in so far as its freedom from plastic flow is concerned. The fact that the material did not melt or dissolve in benzene or undergo plastic flow is indicative of the fact that successful curing or vulcanization has been accomplished.

If a more elastic or plastic final product is desired, this could be accomplished by plasticizing the polymethyl acrylate prior to curing to obtain a faster rate of regain without substantial loss in strength. In addition, the plasticity may be enhanced by compounding the polyacrylate as a homogeneous co-polymer, such as a co-polymer of methyl and ethyl acrylates or methyl and propyl acrylates.

Without limiting myself to any theory or explanation as to this effect of curing, it is to be observed that the bromine may replace either the alpha or beta hydrogens or both in the polymer and the bromine reacted through treatment with sodium sulfide to establish a sulfur cross linkage. On the other hand the curing may have been accomplished through the linking of the methyl groups in which the bromine acted as a catalyst or accelerator of this action.

I conceive that the plastic flow characteristics of an acrylate type polymer may be attributed to the fact that the long molecular chains which comprise the polymer are not connected to each other, and that the plastic flow may be explained on the basis of the long chains moving relative to each other upon the application of stress. Upon release of the stress there will have been found to be a permanent displacement of the chains relative to each other so that the polymer composition does not regain or return to its original position.

In explanation of the cure effected, I conceive that the elimination of plastic flow from an acrylate polymer can be accomplished by a chemical reaction which establishes a bridge or "cross-link" laterally between the long chains of the polymer. This prevents a permanent slippage relative to each other. However, due to the fact that the acrylate type polymers are saturated they do not respond to vulcanization merely by heating with sulfur.

I am not aware of any appreciation, prior to my invention, that curing an acrylate polymer could be accomplished by cross-linking the saturated polymer chains, nor that any successful method of doing the same has been developed.

It will be seen that the above process is adaptable to the two-phase process wherein the polymethyl acrylate can be milled with the curing agent and in this form can be shaped into an article of any desirable form. Following this the material may be heated and the plastic flow eliminated from the products in a desired shape.

It is to be understood that the invention is not to be limited to the above particular example and that the curing may be effected by compounds other than sodium sulfide, such as sodium polysulfide, sodium alcoholates corresponding to materials such as 1-6 hexane di-ol.

In another modification of the invention, a halogenated polymer can be produced by direct halogenation of the methyl acrylate polymer or the co-polymerization of the acrylate with a vinyl chloride. In the presence of pyridine the halogenated polymers can be cross-linked with a di-amine or di-ols. In addition to the acrylate esters, it is possible to use other polymers similarly polymerized from acrylamide, acrylonitrile, allyl isothiocyanate, cyclopentadiene and dipentene.

The cross-linking may be accomplished by means of the elements or groups attached to the alpha or beta carbon atoms of the polymerizing unit and may involve a reaction with the hydrogens attached to these carbon atoms. Cross-linking may also be accomplished through the alkyl radical of the ester group or through the carboxyl group or a part thereof. When derivatives other than esters are used in the polymerization, such as nitriles, amides, etc., the cross-linking may be accomplished through such other groups.

Without limitation to the above examples, the invention encompasses the cross-linking or curing of saturated long chain polymers of the type described so as to eliminate plastic flow properties and the invention is not to be limited except as defined in the following claim.

I claim:

A process for forming an elastic composition substantially free from plastic flow, which comprises dissolving polymeric methyl ester of acrylic acid in benzene, passing bromine into said solution, separating the treated polymer from the benzene, mixing it with sodium sulfide, molding the mixture to the desired shape and vulcanizing the same with heat.

LEO W. RAINARD.